(No Model.) 7 Sheets—Sheet 1.

E. WHIFFEN & D. & V. F. LAKE.
LASTING MACHINE.

No. 502,506. Patented Aug. 1, 1893.

FIG. 1.

Witnesses:
Alex. Barkoff
Hamilton D. Turner.

Inventors
Edward Whiffen
David Lake &
Vincent F. Lake
by their Attorneys
Howson & Howson

(No Model.)  7 Sheets—Sheet 4.

E. WHIFFEN & D. & V. F. LAKE.
LASTING MACHINE.

No. 502,506.  Patented Aug. 1, 1893.

FIG. 4.

(No Model.) 7 Sheets—Sheet 7.
E. WHIFFEN & D. & V. F. LAKE.
LASTING MACHINE.

No. 502,506. Patented Aug. 1, 1893.

Witnesses:
Alex Barkoff
Hamilton D. Turner

Inventors: Edward Whiffen,
David Lake, & Vincent F. Lake
by their Attorneys Howson & Howson

UNITED STATES PATENT OFFICE.

EDWARD WHIFFEN, OF HAMMONTON, AND DAVID LAKE AND VINCENT F. LAKE, OF PLEASANTVILLE, ASSIGNORS TO THE WHIFFEN-LAKE LASTING MACHINE COMPANY, OF PLEASANTVILLE, NEW JERSEY.

LASTING-MACHINE.

SPECIFICATION forming part of Letters Patent No. 502,506, dated August 1, 1893.

Application filed October 14, 1889. Serial No. 326,932. (No model.)

*To all whom it may concern:*

Be it known that we, EDWARD WHIFFEN, a subject of the Queen of Great Britain and Ireland, and a resident of Hammonton, and DAVID LAKE and VINCENT F. LAKE, citizens of the United States, and residents of Pleasantville, New Jersey, have invented certain Improvements in Shoe-Lasting Machines, of which the following is a specification.

The object of our invention is to construct a machine for lasting boots or shoes that will stretch the upper evenly over the last and secure the upper to the insole, as fully described hereinafter, reference being had to the accompanying drawings, in which—

The machine is intended to secure the upper of the shoe to the insole by cement, and we will first give a description of the action of the machine before proceeding with the detailed description, so that a clear understanding of the invention may be had.

To the under side of the last is secured the insole, which has been preferably coated with cement. The last is placed in position on the lasting machine with the jaws open. The upper is then placed on the last, the last being in an upright position, instead of reversed, as in ordinary lasting machines, and the ends of the upper rest in the open jaws. The machine being then put in motion, the jaws first bind upon the upper, and the last and upper are forced upward, the jaws being regulated so that they will not bite into the upper, but will slide evenly thereon until they meet the rib formed on the lower edge of the upper. The jaws then retard the movement of the upper while the last is still proceeding, the springs on the rods of the jaws equalizing the pressure, so that if the upper is placed unevenly on the last in the first instance, the jaws will have a tendency to centralize the upper so that it will be accurately stretched upon its last. When in this position, pressing levers having prepared faces, come in contact with the upper at the lower edge of the last, these jaws having the peculiar movement described hereinafter, so that as they come in contact with the last they will travel under its edge, forcing the edges of the upper under the last and against the cemented insole, the jaws in the meantime having released their hold upon the upper so as to allow for this inward movement. These pressers hold the upper in contact with the cemented insole until the cement has set sufficiently to allow of the withdrawal of the pressers, which fall away from the last, and the lasted upper is ready to be removed from the machine to the finishing machines.

We will now describe in detail the construction and operation of the parts embodying our invention.

A is the base of the machine, and carried by this base is a table B, supported on suitable standards $a, a$. Between the table B and the base A are situated the different mechanisms for giving motion to the several parts of the machine.

Figure 1:
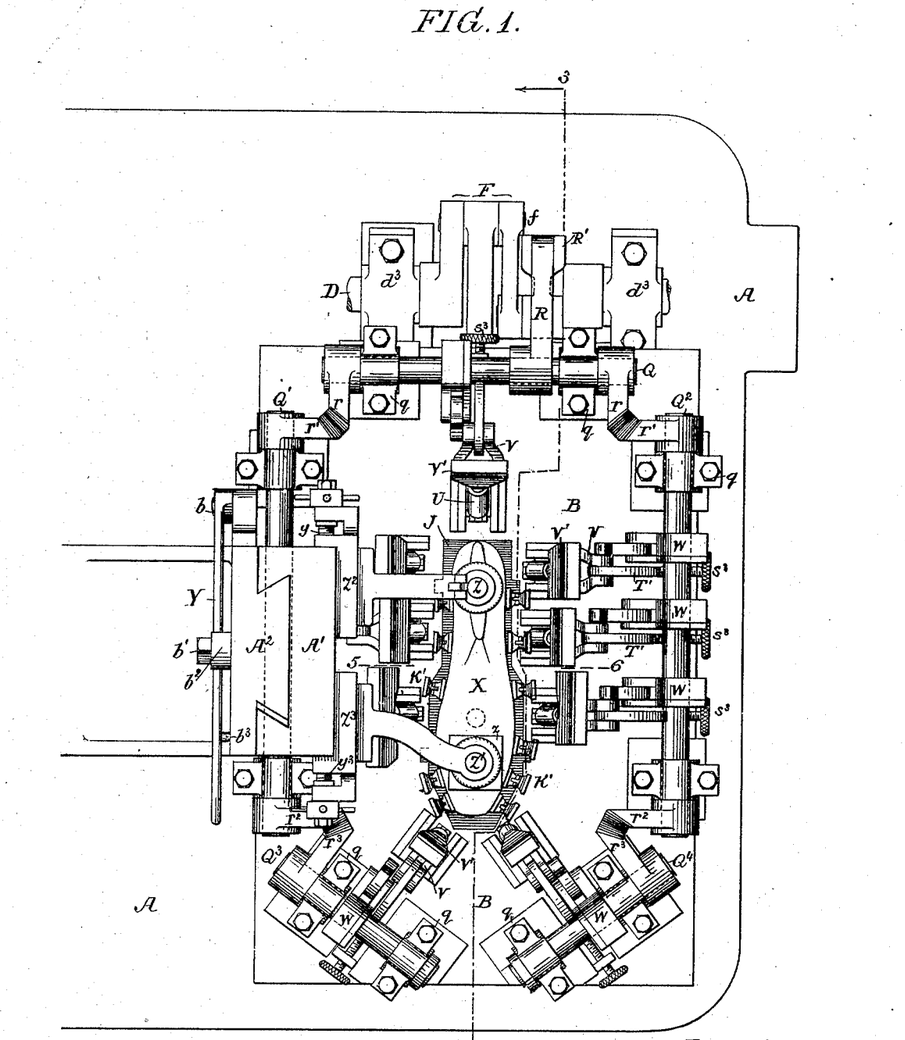
Figure 1 is a plan view of our improved shoe lasting machine. In practice two machines will be employed for lasting a pair of shoes,—one for the right and one for the left, but in the drawings we have merely shown the frame with the right shoe in position.
Figure 2:
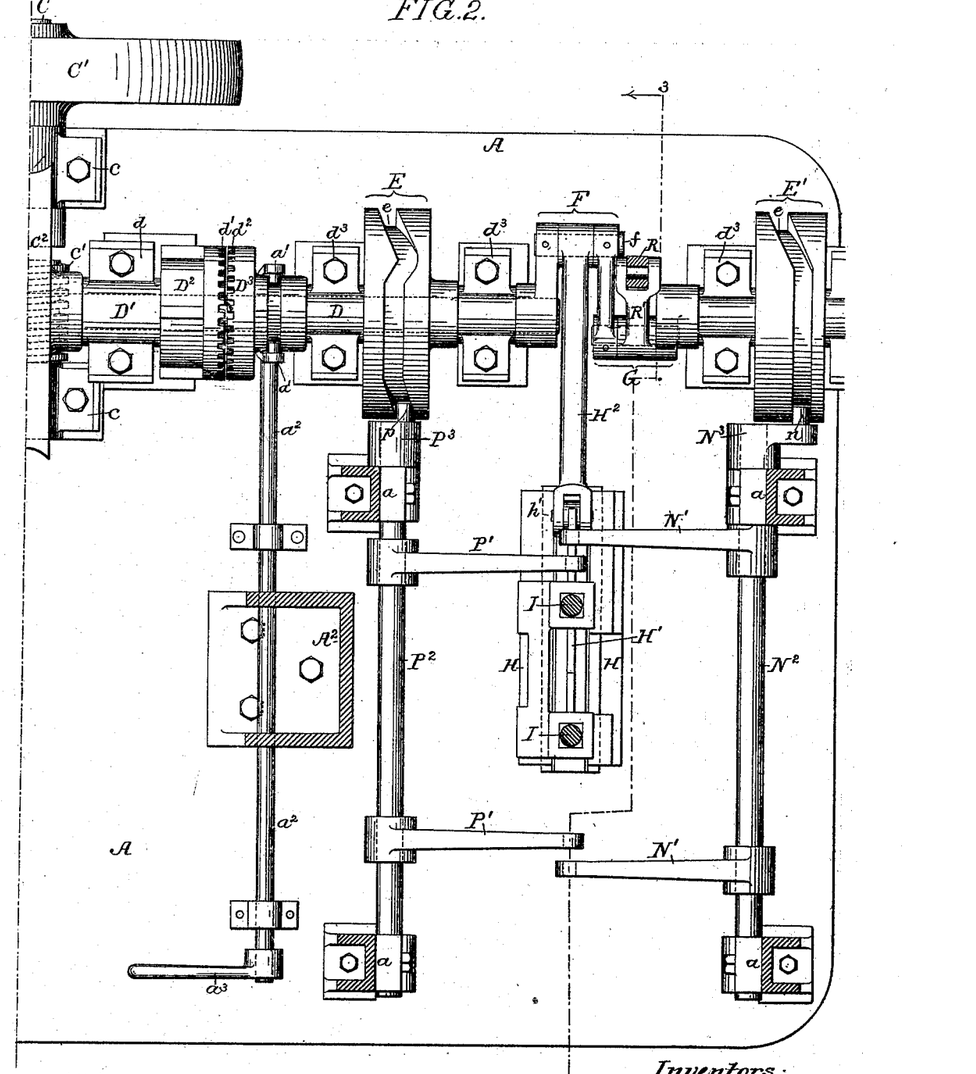
Fig. 2 is a sectional plan view on the line 1—2, Fig. 3.
Figure 4:
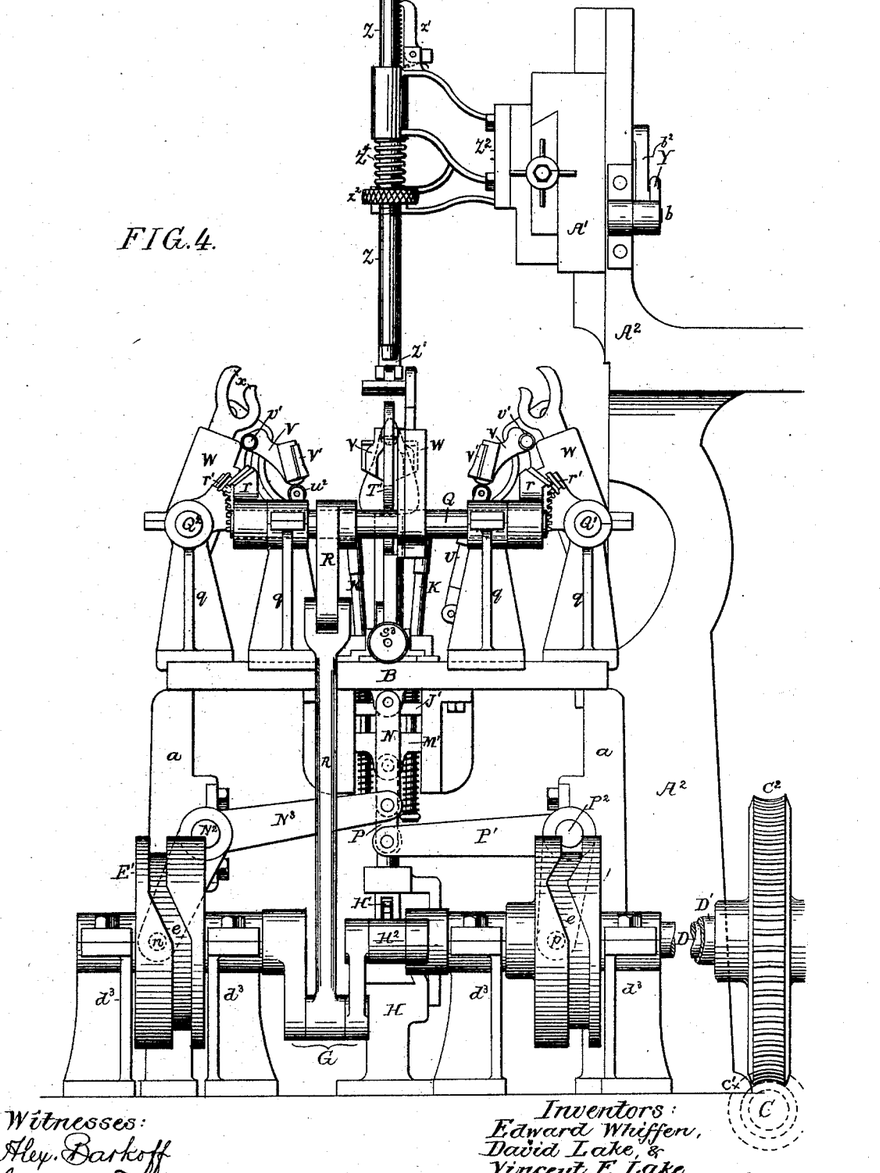
Fig. 4 is a rear view of the machine, looking in the direction of the arrow 1, Fig. 3.

C is the driving shaft, on which is the driving pulley C'. This driving shaft is mounted in suitable bearings $c, c$ on the base A. Secured to the driving shaft is a worm $c'$ which meshes with a worm wheel $c^2$ on a sleeve D' adapted to bearings $d$, as shown in Figs. 1 and 4. Secured to this sleeve is a clutch disk $D^2$ having teeth $d'$ which engage with teeth $d^2$ on a clutch disk $D^3$, free to slide on and adapted to turn with the crank shaft D of the machine. This crank shaft is mounted in bearings $d^3$ projecting from the base of the machine, and passes through the sleeve D' above referred to. The clutch is operated by a clutch yoke $a'$ on a shaft $a^2$ mounted in bearings on the base of the machine, which is provided with an operating handle $a^3$, although it will be understood that other mechanism may be employed for operating this clutch, if desired, without departing from our invention. On the shaft D are cam disks E, E, having cam grooves $e$, $e$ cut in their peripheries as fully shown in Figs. 2 and 4. These cams operate the jaws which hold the upper while the last is forced into it.

The shaft D has a double crank, one portion F of which is connected to mechanism for raising the last so as to stretch the upper upon the same, and the portion G is connected with mechanism for moving the presser into and out of contact with the upper.

We will now describe the mechanism for raising and lowering the last.

Figure 3:
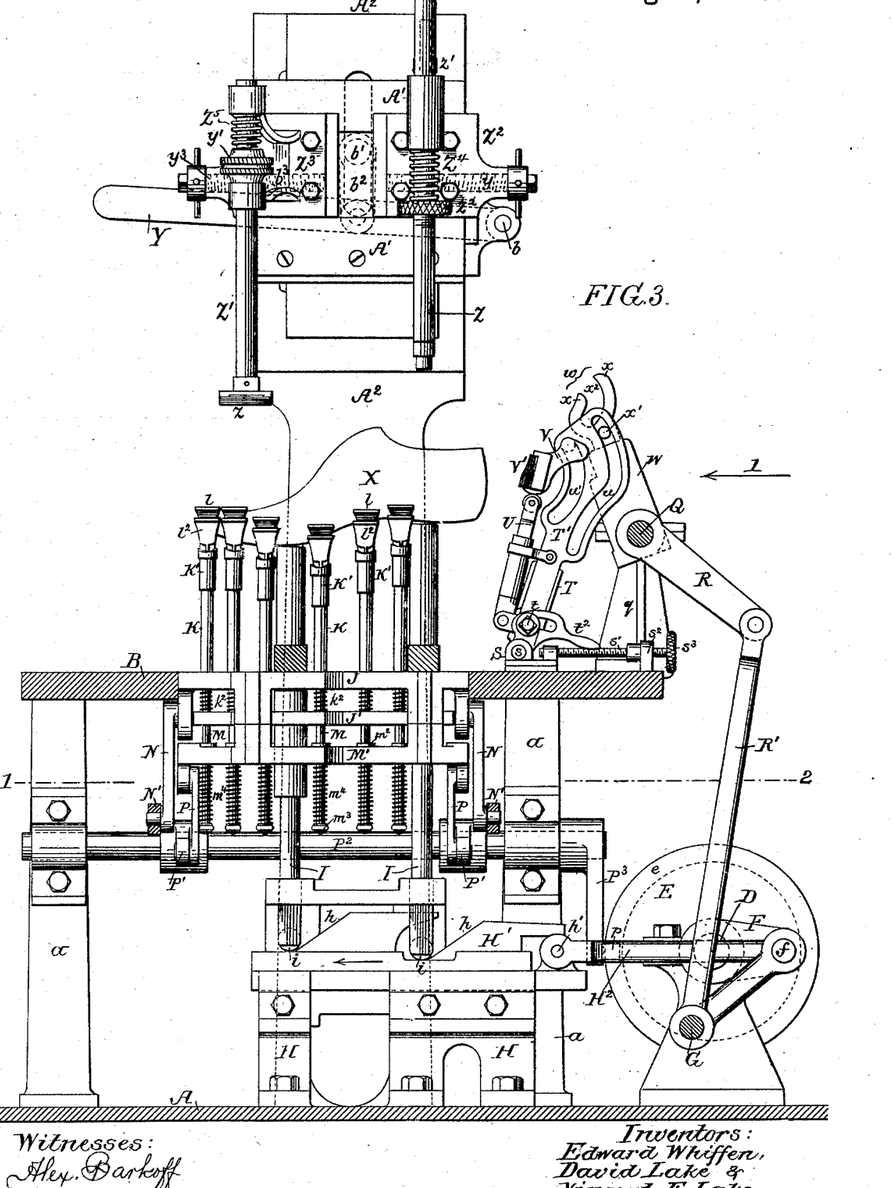
Fig. 3 is a longitudinal section on the line 3—4, Fig. 1.

Adapted to ways H projecting from the base of the machine, is a slide H' having two inclined faces $h$, $h$, and having a lug at the rear end, to which is connected a rod $H^2$ by a pin $h'$. This rod is connected at its opposite end to the crank pin $f$ of the crank F, so that as the shaft D revolves, a reciprocating motion will be imparted to the slide, as will be understood on reference to the drawings. Supporting the last are two vertical rods I, I, having at their lower ends rollers $i$, $i$, which rest upon the inclined ways $h$ on the slide H'. The rods I are guided in bearings on the frame of the machine, and are set at a distance apart, so that one rod supports the heel portion of the last, while the other rod supports the toe portion. As the shaft revolves and the slide moves in the direction of the arrow, Fig. 3, the rods are raised by the inclined ways $h$, $h$, and the last X is raised the required distance. Thus, if the jaws clamp the lower edges of the upper, the last will be forced tightly into the upper, and held in this position until the edges of the upper are turned under the last and secured to the insole.

By preference, the under side of the insole is only cemented at the edges, the center of the insole being free from cement, so as not to interfere with the action of the lifting rods I, I.

We will now describe the mechanism for operating the clamps which hold the upper while the last is forced into position, reference being had to Figs. 3, 5, 6, 7 and 8.

Adapted to an opening in the table B is a carrier J, and secured to this carrier is a plate J'. In the carrier is a series of openings $j$, and in the plate is a series of openings $j'$. Passing through each of the openings in the plate J' is a hollow spindle K. This spindle has at its lower end a fixed collar $k$, rounded on its under side and adapted to the counter sunk portion of the opening $j'$, while sliding on the spindle is a loose collar $k'$, having its upper side rounded, to coincide with the countersunk portions of the openings $j$ in the carrier J and between the two collars is a friction spring $k^2$. The object of this device is to hold the hollow spindle K in any postion to which it is set, there being sufficient friction to overcome the tendency of the spindle to fall. Passing through the hollow spindle K is a rod L, carrying at its upper end a head K' it being secured to the head by means of a pin passing through a slot in the hollow spindle K. The spindle K carries at its upper end a fixed jaw $l$. Pivoted at $l'$ is a movable jaw $l^2$ having an arm $l^3$ which engages with a pin $l^4$ on the head K', so that when the spindle K is raised, the pin $l^4$ will bear against the arm $l^3$ of the movable jaw, forcing it toward the stationary jaw until it assumes the position shown in Fig. 7. On the outer end of each jaw is a lip $g$, and the jaws are so formed, that when the lower edge of the upper is placed within the jaws, they do not bite into the leather of the upper, but slide upon the upper until they come in contact with a rib at the lower edge of the upper, the rib being of a thickness sufficient to prevent the jaws from slipping past the same. The upper is thus held at its lower edge by the jaws while the last is forced into position, and in no case will the exposed portion of the upper be mutilated by the jaws, as the rib portion is turned under the insole and secured thereto, and in some cases may be removed by cutting, after the upper has been secured to the insole by the mechanism described hereinafter.

Figure 5:
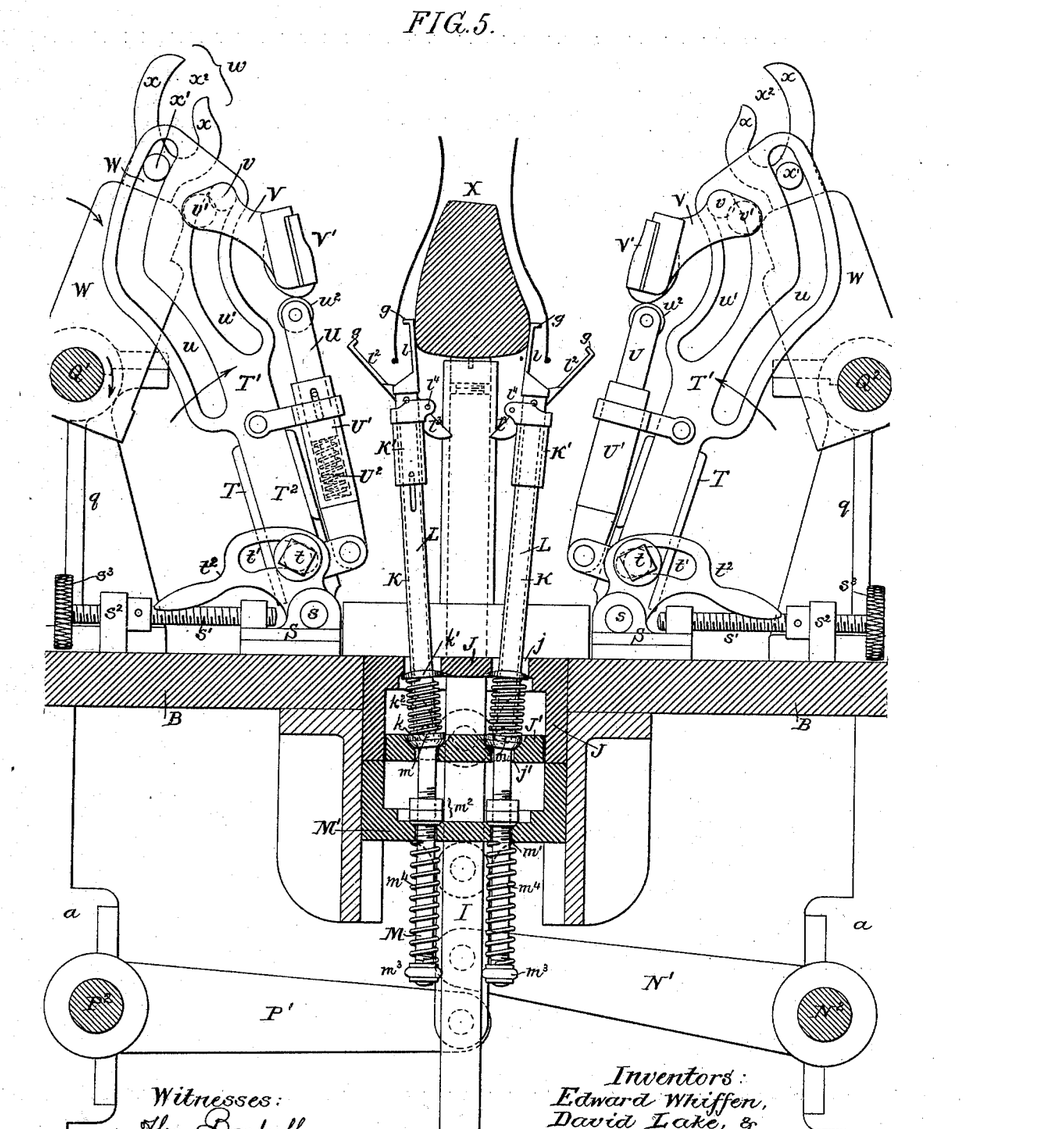
Fig. 5 is a transverse sectional view on the line 5—6, Fig. 1, the parts being enlarged.
Figures 6, 7, 8:
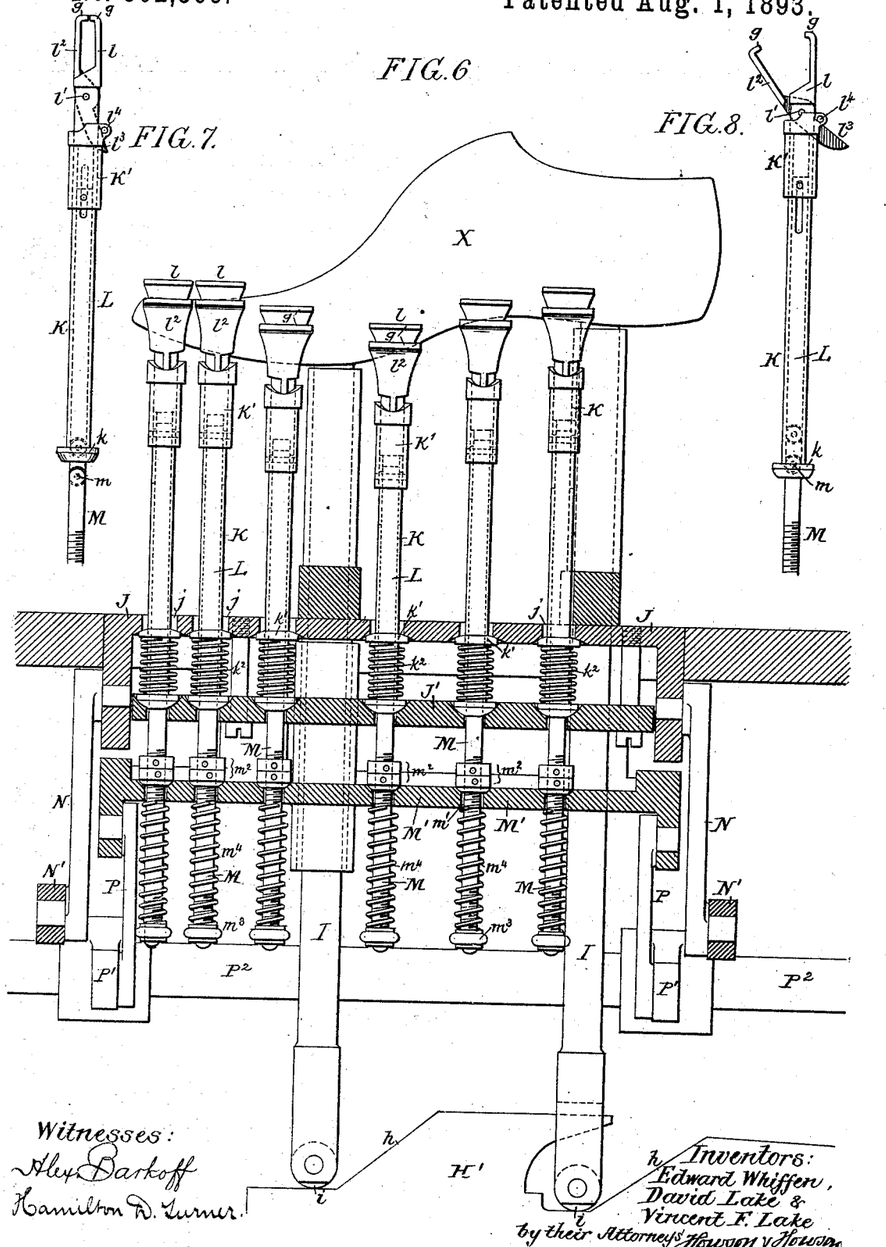
Fig. 6 is a longitudinal sectional view, showing the gripping mechanism enlarged.
Fig. 7 is a detail view of one of the gripping jaws, closed.
Fig. 8, is a view of one of the jaws open.

Pivotally connected by a link at $m$ to the lower end of the rod L, is an extension M, shown in Figs. 5 and 6. This extension passes through openings $m'$ in the slide M' adapted to guide ways on the under side of the table B. The extensions M of the rods L are screw threaded, as shown, and adapted to the threads are nuts $m^2$ and $m^3$, the nuts $m^3$ being at the lower ends of the rods, and between the nuts $m^3$ and the under side of the slide M' is a spring $m^4$, and the nuts $m^2$ rest on top of the slide M', so that as the slide is lowered it will draw the rods L down, closing the jaws, as described, the springs allowing the jaws to give when undue strain is placed upon them. These springs can be regulated by moving the nuts $m^3$ toward or from the slide M'. The slide J is connected at each end by means of a link N, to arms N' on a rock shaft $N^2$, shown clearly in the plan view, Fig. 2, the rock shaft having at its inner end a crank arm $N^3$ having a pin $n$ which is adapted to the cam groove $e$ in the cam E'. The slide M' is connected at each end by links P, to arms P' on a rock shaft $P^2$ having its bearings in brackets on the base of the machine, and on the inner end of this rock shaft is a crank arm $P^3$ having a pin $p$ adapted to the cam groove in the cam E on the shaft D.

The crank arms are set as shown in the drawings, and the cam grooves are cut in the peculiar form shown, to give the desired motion to the several parts of the mechanism for clamping and holding the upper in position, although other driving mechanism may be employed without departing from our invention.

The clamps are placed as shown in the plan view, Fig. 1, around the last so as to give an even tension on all parts of the upper. It will be evident that the position of these clamps in respect to the upper may be varied as circumstances require.

We will now describe the mechanism by which the pressing pads are forced against and under the last.

Mounted in bearings $q$ projecting from the table B, are in the present instance five rock shafts Q, $Q'$ $Q^2$ $Q^3$ $Q^4$, as shown in Fig. 1. The shaft Q is the prime mover, and has secured to it an arm R connected by a rod $R'$ to the crank G of the shaft D, (Figs. 2 and 3) so that a vibrating motion is given to the rock shaft Q as the shaft D revolves. On the outer ends of the shaft Q segmental gears $r, r$ which engage with segmental gears $r' r'$ on the ends of the longitudinal rock shafts $Q'$ $Q^2$. These rock shafts $Q'$ $Q^2$ are provided at their opposite ends with segmental gears $r^2$, which in turn mesh with segmental gears $r^3$ on the rock shafts $Q^3$ $Q^4$ at the front of the machine, so that all the rock shafts will vibrate simultaneously.

Surrounding the lasts is a series of mechanisms carrying pads which press the upper onto the insole secured to the last. These mechanisms are substantially alike, with the exception that the adjustments of some of them are different from others, so as to accord with the contour of the last, and we will therefore only describe one of the mechanisms.

Figure 9:
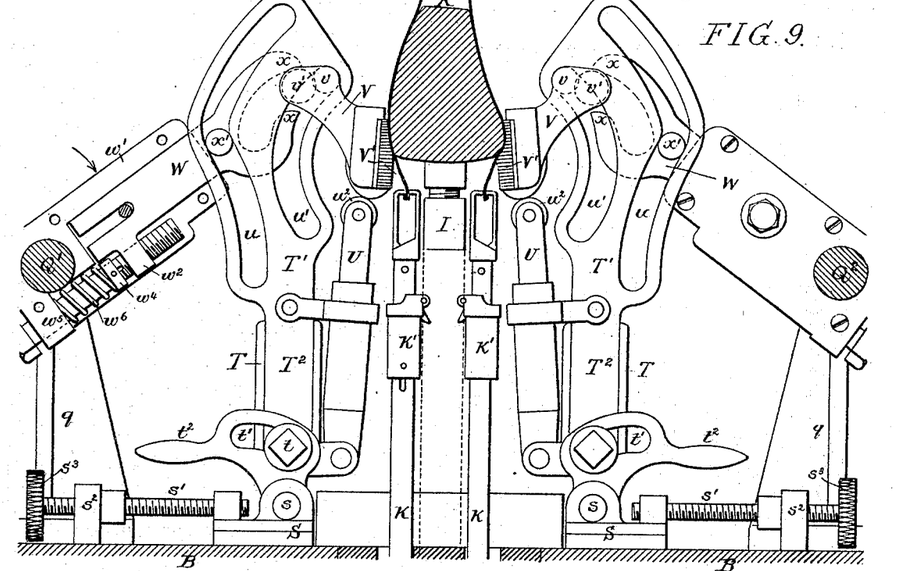
Figs. 9 and 10, are diagrams illustrating the operation of the machine.
Figure 10:
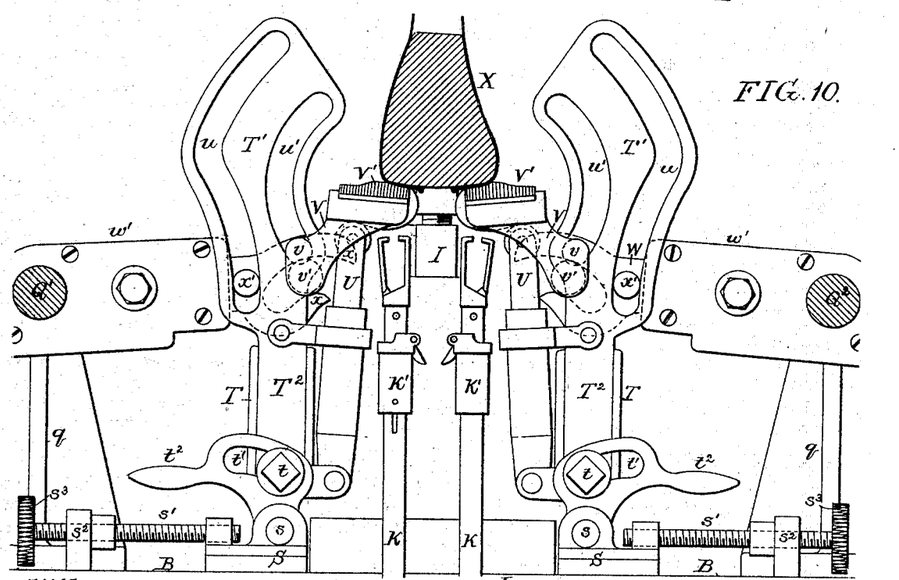

Pivoted at $s$ to bearings S, adjustable on the table B, are blocks T in which are secured cam plates $T'$, the shanks $T^2$ of which extend into the block T and has a pin $t$ which passes through a cam slot $t'$ in a lever $t^2$, so that on the movement of the lever the cam plate can be raised or lowered for adjustment. The bearing S can be moved toward or from the center of the machine by a set screw $s'$ which passes through a lug $s^2$ on the table B. The set screw is provided with a hand wheel $s^3$ by which it is manipulated. The cam plate $T'$ has two cam-ways $u, u'$ cut therein and of the peculiar form shown in Fig. 5, and adapted to the cam-way $u'$ is a pin $v$ projecting from a block V carrying the presser pad $V'$, which can be made of any suitable material but is preferably made of vulcanized rubber. The face of this pad is of the peculiar form shown, in order to accurately fit the portion of the last for which it is intended. The shape of the pads will vary according to the shape of the last. The block V is supported on a vertical post U, carrying at its upper end a friction roller $u^2$ which rests against a projection on the block V. This post U passes into a socket $U'$ and intervening between the lower end of the post and the socket is a spring $U^2$. The socket is secured to the cam plate $T'$, as shown. By having the spring under the post U, any irregularities in the upper or last will be taken up by the springs without straining the machine. On the block V is a pin $v'$ which engages with the pronged end $w$ of a slide W, which is adapted to an arm $W'$ secured to the rock shaft Q. The arm W is duplicated, as shown in plan view in Fig. 1, on the other rock shafts, as will be readily understood. The slide W has a limited movement on the arm and is secured thereto by a plate $w'$. A lug $w^2$ projects from one side of the slide, and tapped into this lug is a screw-threaded bolt $w^3$ having a shoulder $w^4$ between which and a projection $w^5$ on the arm is a spring $w^6$, so that the spring yields to any undue pressure upon the slide W, and the tension of this spring can be adjusted by the set screw $w^3$, as will be readily understood on reference to Fig. 9. The two prongs $x, x$ of the forked end $w$ of the slide W are of the peculiar form shown in Fig. 5, and as the machine is put in motion, and as the rock shaft moves in the direction of the arrow, Fig. 5, the arm will also move toward the last. A pin $x'$ on the slide W engages with the cam-way $u$ in the plate $T'$ and presses the plate in the direction of its arrow to the position shown in Fig. 9, where the pressing pad V comes in contact with the upper and presses it against the last. At this point the pin $v'$ on the block V enters the opening $x^2$ between the prongs $x, x$, and as the rock shaft continues to move the prongs $x, x$ carry the presser block V to the position shown in Fig. 10, the pin $v$ of the presser block traveling the full length of the slot of the cam-way $U'$, and the block is then moved a quarter of a circle in its passage from the position shown in Fig. 9 to that shown in Fig. 10, the cam-ways being so cut and the opening $x^2$ being so formed as to make the block travel in the arc of a circle around the edge of the last, pressing the upper tightly against the last, and when it reaches the position shown in Fig. 10, the block presses hard upon the under side of the last, forcing the upper against the cemented under side of the insole, and keeps it in this position until it is released by the further movement of the machine. This pressure can be maintained by the attendant for a sufficient length of time or until the cement is set and the upper securely fastened to the insole.

It will be understood, as before remarked, that the face of each block V differs, according to the contour of the last, and in the drawings we have shown three of these presser blocks on each side of the last and two at the toe portion and one at the heel.

To limit the upward movement of the last, we provide two spindles Z $Z'$, the former being adapted to the heel portion of the last and the spindle Z' is provided with a pad $z$ adapted to bear upon the toe portion of the last. The spindle Z is adjustable vertically in its bearings, and is held in the adjusted position by a spring pawl $z'$. The spindle Z is raised by taking hold of nut $z^2$, the spring pawl holding it in position. To lower the spindle Z the pawl $z'$ is released from the rack on the spindle Z, the spindle then sliding down in the bearing. The bearing $Z^2$ is adapted to slide in guide ways A' on a standard $A^2$ projecting from the frame of the machine. A relief spring $Z^4$ is placed on the rod Z, between the nut $z^2$ and the bearing $Z^2$, and a similar spring $Z^5$ is placed on the rod Z' between the nut $y'$ and the bearing $Z^3$, so that any extra pressure of the last, owing to miscalculations, in setting, will be taken up by these springs. A set screw $y$ on the bearing $Z^2$ is adapted to a nut on the guide-way A', so that by operating said set screw the bearing can be moved transversely in the guideways. The spindle Z' is also adjustable vertically by means of a nut $y'$, which fits between the two arms of the bearing $Z^3$, which is also adjustable transversely on the guideways A' by means of a set screw $y^3$. The guide-way A' is vertically adjustable on the standard $A^2$. A lever Y, pivoted at $b$ to the standard $A^2$ is connected to a pin $b'$ on the rear of the guide-way A' by a link $b^2$, so that by raising or lowering the lever the guideway can be raised to release the lasted shoe. The lever can be held in its lowest position by a pin $b^3$ which projects from the rear of the standard $A^2$, and by simply moving the lever out away from the pin it will be released and can be raised, there being sufficient spring in the lever to allow of this movement.

We claim as our invention—

1. The combination in a shoe lasting machine, of the last support, mechanism for vertically raising said support, lasting nippers mounted around the said support to engage with the upper of the shoe to be lasted, mechanism for closing the jaws of said nippers upon the upper, pressing pads also arranged around the last beyond the nippers, with mechanism for moving said pads first against the sides of the upper when it is tightly stretched upon the last and for turning said pads under the last when the upper is released from control of the lasting jaws, substantially as specified.

2. The combination in a lasting machine, of the nippers for engaging the upper, said nippers being independently mounted in the machine, each nipper being provided with a smooth face which will slide upon the upper, and a shoulder or rib for engaging with the upper, with mechanism for closing said nippers, substantially as specified.

3. The combination in a lasting machine, of the last support, the series of nippers arranged around the last, mechanism for operating the jaws of the nippers, with mechanism substantially as described whereby the jaws are automatically and independently confined to the upper, substantially as described.

4. The combination in a machine for lasting ribbed uppers, of the last support, a series of independent nippers arranged around the last, the jaws of said nippers having lips forming a recess back of the lips, with mechanism for closing said jaws upon the upper, said jaws automatically engaging with the upper when they reach the rib, substantially as specified.

5. The combination in a shoe lasting machine, of the last supporting mechanism, the slides J and M', the slide M' situated below the slide J, the slide J carrying the hollow spindle K, the slide M' carrying an extension of the rod L, jaws carried by the rod L, and levers connected to said slides so that one slide will move independently of the other, substantially as described.

6. The combination in a shoe lasting machine, of the last supporting mechanism, and the clamp jaws carried by a rod, a spindle through which the rod passes having a fixed and a movable collar, a spring interposed between said collars, said collars being rounded on their outer faces and adapted to countersunk portions in the slide J, substantially as described.

7. The combination in a shoe lasting machine, of the last supporting mechanism, the clamp, jaws, and the hollow spindle carrying the same, a rod L, carrying mechanism for operating the said jaws, a rod M pivoted to said rod L, a slide M' through which the rod M passes, a nut on the lower end of the rod, and a spring interposed between the nut and the slide, substantially as and for the purpose set forth.

8. The combination in a lasting machine, of the last support, a series of nippers on each side of the last for engaging with the upper, a plate, the movable jaws of the nippers being attached to the plate, with means for moving said plate, each jaw having a smooth surface for sliding on the upper, and shoulders or ribs for engaging with the upper after the slipping movement is completed, each nipper acting independently of the other nippers, substantially as specified.

9. The combination in a lasting machine, of the last supporting mechanism, the jaws, mechanism for operating said jaws, with blocks V carrying pressing pads, with a cam plate carrying said block, and an arm provided with a forked projection adapted to engage with a pin on the presser block so as to force it against and under the last, substantially as described.

10. In a lasting machine, the combination of the last supporting mechanism, the lasting jaws, the presser block, the pivoted cam plate having cam-ways $u$, $u'$ substantially as described, the pin $v$ on the block adapted to the cam-way $u'$ and supported on a post U, a rock shaft and an arm W carrying a forked bar, a pin on the presser block adapted to engage with the prongs of said bar, with a pin $x'$ on the fork adapted to the cam ways $u$, and mechanism for operating said parts so that the presser block will press against the last and under the same, substantially as described.

11. The combination in a lasting machine, of the last support, lasting jaws for the upper, presser pads for forcing the upper onto the insole, a block carrying each pad, a hinged cam plate carrying said block, cams in said plate cut substantially as described, a pin on the block engaging with one cam, a forked bar having a pin entering the other cam, an arm carrying said forked bar, a rock shaft to which the arm is secured, a regulating screw for adjusting the bar on the arm, and a spring between the arm and bar, substantially as described.

12. The combination in a lasting machine, of the cam plate T', a block V supported thereby, and an arm W adapted to act upon the said block, with a pivoted block T, mechanism for adjusting the plate upon the said block, substantially as described.

13. The combination in a shoe lasting machine, of the presser block, cam plate T' substantially as described, with a post U carrying at its upper end a friction roller supporting the presser block, with a socket U', and a spring $U^2$ between the post and the socket, the whole acting substantially as and for the purpose set forth.

14. The combination in a lasting machine, of the last support, a series of independent nippers arranged on each side of the last support, a plate for supporting the series of nippers, and a plate connected to the movable jaws of the nippers, the jaw of each nipper having a smooth surface for sliding upon the upper, and a shoulder or rib for engaging with the upper after the slipping movement is completed, with mechanism for operating the movable jaw controlling plate whereby the jaws are closed, said jaws acting independently and automatically to engage the upper when they reach a given point in respect to the edge of the upper, substantially as specified.

15. The combination in a shoe lasting machine, of the last supporting mechanism, clamping mechanism, and the pressing mechanism, with a crank shaft having cranks F and G, the crank F operating upon the last supporting mechanism, the crank G being connected to and operating the presser pads, with cams E, E' on said shaft, longitudinal rock shafts having pins engaging with said cams, and arms acting upon the clamping mechanism, the whole constructed and combined substantially as described.

16. The combination in a shoe lasting machine, of the last supporting mechanism, the nippers and pressers, the vertically adjustable stop rods Z, Z' for the last, and independently adjustable bearings for the said rods, substantially as and for the purpose described.

17. The combination in a lasting machine, of the last supporting devices, mechanism for operating said devices, stop rods Z, Z', a pad $z$ on the stop rod Z', bearings for said rods adjustable toward or from each other, a slide on which the bearings are mounted, and with mechanism for raising said slide, substantially as described.

18. The combination in a shoe lasting machine. of the centrally situated last supporting devices, clamps surrounding said last, mechanism for operating said clamps, pressure blocks, also surrounding said last, with the main rock shaft connected to the crank shaft of the machine, longitudinal rock shafts $Q'$, $Q^2$, and inclined rock shafts $Q^3$, $Q^4$, the whole geared substantially as and for the purpose set forth.

19. The combination in a lasting machine, of the last support, the independent nippers arranged on each side of the last support for engaging with the upper to be lasted, a plate supporting said nippers, a yielding connection between the plate and the nippers, a plate with which the movable jaw of each nipper is connected, with a yielding connection between each jaw and the plate, substantially as described.

20. The combination in a shoe lasting machine, of the last support, the nippers engaging with the upper to be lasted, mechanism for operating said nippers, mechanism for moving one of said parts away from the other, with presser pads on each side of the last beyond the nippers, and mechanism whereby the presser pads confine the upper to the edge of the last after it is stretched thereon and for turning the presser pads with the edge of the upper under the last after the nippers have released the upper, substantially as described.

21. The combination in a lasting machine of the last support, the independent nippers arranged on each side of the support, the supporting plate for the nippers, and a controlling plate for the movable jaws, mechanism for operating the same, pressing pads arranged on each side of the machine beyond the lasting nippers, and mechanism whereby the said jaws first impinge upon the edge of the last and turn thereunder, the mechanism being so timed that the jaws confine the upper until the pressers impinge upon and confine the upper to the last, when the nippers are released and the pressers turn under the last and turn the upper, substantially as specified.

22. The combination in a lasting machine, of the last support, mechanism for turning the upper upon the last, with presser pads, mechanism for giving said pads a lateral motion toward the sides of the last and for giving it a rolling motion under the last, the edge of the last acting as a pivot, the bearing surface of the pad having two faces, one face corresponding to the contour of a portion of the side of the last, and the other portion corresponding to the contour of a portion of the bottom of the last, substantially as described.

In testimony whereof we have signed our names to this specification in the presence of two subscribing witnesses.

EDWARD WHIFFEN.
    DAVID LAKE.
    VINCENT F. LAKE.

Witnesses:
 HENRY HOWSON,
 HARRY SMITH.